US006845187B1

(12) United States Patent
Weaver et al.

(10) Patent No.: US 6,845,187 B1
(45) Date of Patent: Jan. 18, 2005

(54) LINEAR OPTICAL BEAM TRANSLATOR FOR OPTICAL ROUTING

(75) Inventors: Samuel P. Weaver, Boulder, CO (US); Robert T. Weverka, Boulder, CO (US); Richard S. Roth, Boulder, CO (US)

(73) Assignee: PTS Corporation, San Jose, CA (US)

( * ) Notice: Subject to any disclaimer, the term of this patent is extended or adjusted under 35 U.S.C. 154(b) by 316 days.

(21) Appl. No.: 09/658,158

(22) Filed: Sep. 8, 2000

(51) Int. Cl.[7] .............................. G02B 6/26; H04J 14/00
(52) U.S. Cl. .............................. 385/18; 385/15; 385/16; 385/17; 398/48; 398/49; 398/50; 398/82
(58) Field of Search ............................ 385/15, 16, 17, 385/18, 24, 14, 37, 25; 398/48, 49, 50, 82, 84

(56) References Cited

U.S. PATENT DOCUMENTS

| | | | | |
|---|---|---|---|---|
| 5,208,880 A | * | 5/1993 | Riza et al. ..................... | 385/18 |
| 5,414,540 A | | 5/1995 | Patel et al. .................... | 359/94 |
| 5,629,791 A | | 5/1997 | Harrigan ...................... | 359/223 |
| 5,774,604 A | | 6/1998 | McDonald .................... | 385/18 |
| 5,917,625 A | | 6/1999 | Ogusu et al. ................. | 359/130 |
| 5,960,133 A | | 9/1999 | Tomlinson .................... | 385/18 |
| 5,999,672 A | | 12/1999 | Hunter et al. ................. | 385/37 |
| 6,031,946 A | * | 2/2000 | Bergmann et al. ............ | 385/18 |
| 6,084,717 A | | 7/2000 | Wood et al. .................. | 359/629 |
| 6,097,519 A | | 8/2000 | Ford et al. .................... | 359/130 |
| 6,097,859 A | | 8/2000 | Solgaard et al. .............. | 385/17 |
| 6,108,471 A | | 8/2000 | Zhang et al. .................. | 385/37 |
| 6,204,946 B1 | | 3/2001 | Aksyuk et al. ................ | 359/131 |
| 6,229,639 B1 | | 5/2001 | Ozarski et al. ................ | 359/223 |
| 6,307,657 B1 | | 10/2001 | Ford .............................. | 359/130 |
| 6,363,183 B1 | * | 3/2002 | Koh .............................. | 385/19 |
| 6,404,942 B1 | * | 6/2002 | Edwards et al. .............. | 385/18 |
| 6,453,083 B1 | * | 9/2002 | Husain et al. ................. | 385/17 |
| 6,614,581 B2 | * | 9/2003 | Anderson ...................... | 359/295 |
| 2002/0061159 A1 | * | 5/2002 | Dahmani et al. ............. | 385/18 |
| 2003/0007237 A1 | * | 1/2003 | Anderson ...................... | 359/296 |
| 2003/0007720 A1 | * | 1/2003 | Staple et al. .................. | 385/18 |
| 2004/0022483 A1 | * | 2/2004 | Staple et al. .................. | 385/18 |

OTHER PUBLICATIONS

Grade, John D. et al., "A Large–Deflection Electrostatic Actuator For Optical Switching Applications," Solid–State and Actuaotr Workshop, Hilton Head Island, SC. Pp. 97–100 (Jun. 2000).

"Low Voltage Piezoelectric Stacks," Transducer Elements, Catalog #3 1998, pp. 30–45, Piezo Systems, Inc. Cambridge, MA 02139.

Nishi, I. et al., "Broad–passband–width optical filter for multi/demultiplexer using a diffraction grating and a retroreflector prism." Electronic Letters. Vol. 21(10). Pp. 423–424 (May 9, 1985).

Sun. Z.J. et al., "Demultiplexer with 120 channels and 0.29–nm channel spacing," IEEE Photonics Technology Letters. Vol. 10(1), Pp. 90–92 (Jan. 1998).

Philippe, P. et al. "Wavelength demultiplexer: using echelette gratings on silicon substrate," Applied Optics. Vol. 24(7). Pp. 1006–1011 (Apr. 1, 1985).

Ford. J.E. et al. "Wavelength Add–Drop Switching Using Tilting Micromirrors," Journal of Lightwave Technology, vol. 17, No. 5. Pp. 904–911 (May 1999).

Rallison, R.D., "Dense Wavelength Division Multiplexing (DWDM) and the Dickson Grating." White Paper Jan. 6, 2001.

* cited by examiner

Primary Examiner—Brian M. Healy
(74) Attorney, Agent, or Firm—Townsend and Townsend and Crew LLP

(57) ABSTRACT

An optical routing apparatus that allows flexible and effective routing of optical signals between input and output ports is provided. The apparatus makes use of one or more linearly actuated mirrors, with different routing configurations of the optical signals resulting from different mirror positions. For each such mirror, the linear actuation is may be performed along an axis that is either parallel or perpendicular to the mirror surface.

56 Claims, 8 Drawing Sheets

LINEAR OPTICAL BEAM TRANSLATOR FOR OPTICAL ROUTING

BACKGROUND OF THE INVENTION

This application relates generally to fiber-optic communications and more specifically to techniques and devices for routing optical signals to different output ports (or, conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more channels promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

The present invention provides an optical routing apparatus that allows flexible and effective routing of optical signals between input and output ports. The apparatus makes use of one or more linearly actuated mirrors, with different routing configurations of the optical signals resulting from different mirror positions. For each such mirror, the linear actuation is preferably performed along an axis that is either parallel or perpendicular to the mirror surface.

Thus, in one embodiment of the invention, the optical routing apparatus has an input port configured to provide an optical signal and has a plurality of output ports configured to receive the optical signal. It also has a mirror and a linear actuator disposed to move the mirror to a plurality of positions. The optical signal is directed to a first output port when the mirror is in one of its positions and is directed to a second output port when the mirror is in another of its positions. In different embodiments, the linear actuator moves the mirror perpendicular or parallel to its surface. An advantage where the mirror is moved parallel to its surface is that an optical path that is reflected off the mirror is relatively insensitive to the precise mirror position. In such embodiments, the actuator may lie in the path of the optical signal when the mirror is positioned outside the optical path. In various of such embodiments, the optical path is unobstructed by including a bore through the actuator, or including a nonreflective region transparent to the wavelength of the optical signal in the actuator, or using an actuator constructed of a nonreflective material transparent to that wavelength. In other embodiments, the optical path is also directed with a fixed reflective surface.

In another embodiment of the invention, the optical routing apparatus has two input ports and two output ports. A mirror disposed on a linear actuator allows at least two configurations for directing two optical signals. In the first configuration, the optical signal provided from the first (second) input port is directed to the first (second) output port, and in the second configuration, the optical signal provided from the first (second) input port is directed to the second (first) output port. In one embodiment, a single mirror disposed to move parallel to its surface is used. Where the actuator is positioned in the path of one of the optical signals, it may include a bore or include nonreflective material transparent to the signal's wavelength so that propagation of the signal is unobstructed. In a particular embodiment, the mirror is reflective on both sides, with different optical paths reflecting off the two sides of the mirror. In still other embodiments, fixed reflective surfaces are also used in directing the optical signals.

In yet a further embodiment of the invention that permits routing a signal from a first (second) input port to a first (second) output port when in one configuration, and routing a signal from the first (second) input port to the second (first) output port in a second configuration, three linearly actuated mirrors are used. All of the mirrors may use the same parallel or perpendicular form of actuation, or a combination of parallel-and perpendicular-actuated mirrors may be used. Such embodiments may make use of the techniques described above to permit an actuator that moves a mirror parallel to its surface to lie within an optical path without obstructing propagation of the signals. Such embodiments may also include fixed reflective surfaces to direct the optical signals.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DESCRIPTION OF THE SPECIFIC EMBODIMENTS

I. Introduction

Figure 1:
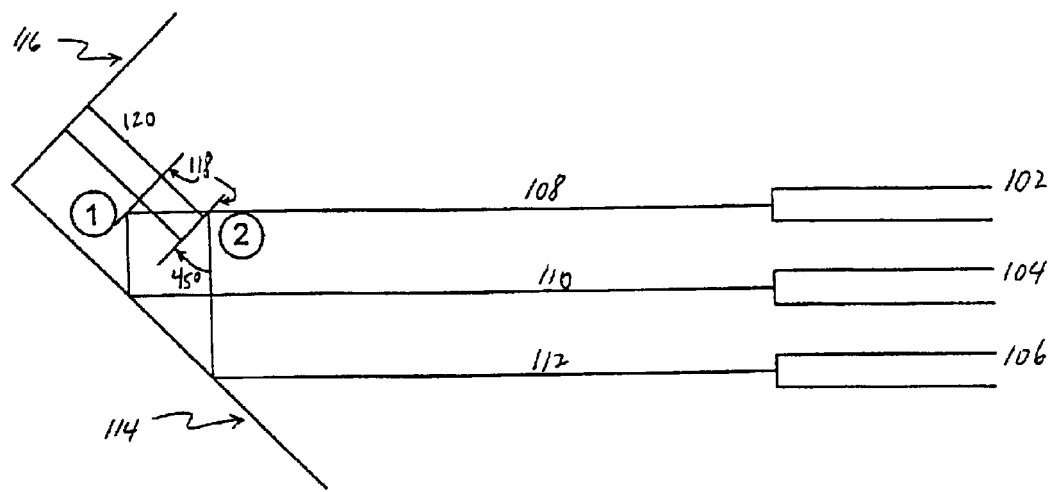
FIG. 1 illustrates the optical pathways taken in one embodiment using a plunger configuration of a linearly actuated steering mirror for a 1×2 optical switch.

The following description sets forth embodiments of a linear optical beam translator for use in an optical wavelength router according to the invention. Embodiments of the invention can be applied to network elements such as optical add-drop multiplexers (OADMs), optical cross-connects (OXCs), and wavelength-selective cross-connects (WSXCs), among others, to achieve the goals of optical networking systems.

The general functionality of one optical wavelength router that can be used with the embodiments of the invention is described in detail in the copending, commonly assigned, filed Nov. 16, 1999 and assigned Ser. No. 09/442,061 entitled "Wavelength Router," which is herein incorporated by reference for all purposes. As described therein, such an optical wavelength router accepts light having a plurality of spectral bands at an input post and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber). The muting geometries described below me independent of the wavelength of the optical signal. Accordingly, they are used by themselves in some embodiments, while in other embodiments they are used in combination with a dispersive element (such as described in Application Ser. No. 09/442,061) for optical signals multiplexed with various wavelength components.

Embodiments of the invention are described below for two types of optical switches referred to herein as the "1×2" and "2×2" switch, and appropriate modifications for other switch configurations will be apparent to those of skill in the art upon reading such description. The "1×2" switch is used to direct an optical signal from a single input port to one of two output ports in the router. The "2×2" switch is used to direct a pair of signals from two input ports to two output ports; in one configuration ("passthrough") the first and second input signals are directed to the first and second output ports respectively, while in the other configuration ("crossed"), the first and second input signals are directed to the second and first output ports respectively.

For example, in one embodiment the "1×2" switch is used to direct a signal with a first wavelength $\lambda_1$ from the input port to a first output port and to direct a signal with a second wavelength $\lambda_2$ from the input port to a second output port. The "2×2" switch may be used, for example, to add a signal of wavelength $\lambda_1$ and drop a signal of wavelength $\lambda_2$ from a trunk line. In such an embodiment, the two input ports correspond to a "trunk in" port and an "add" port; the two output ports correspond to a "trunk out" port and a "drop" port. In the passthrough configuration, the "trunk in" input signal is routed to the "trunk out" output port and the "add" input signal is routed to the "drop" output port. In the crossed configuration, the "trunk in" input signal is routed to the "drop" output port and the "add" input signal is routed to the "trunk out" output port. Other uses of such switch configurations are possible as are alternative switch configurations.

In embodiments of the invention, the optical signals are routed with steering mirrors that are displaced nearly with actuators, sometimes in combination with fixed reflective surfaces. Such linear displacement is preferably in a direction perpendicular ("plunger configuration") or parallel ("slider configuration") to the plane in which the reflective surface of the mirror lies, although more generally the invention encompasses linear translation of a steering mirror in any direction. Various technologies may be used to drive the linear translators. Without limitation, examples of appropriate driving technologies include the use of piezoelectric actuator stacks, electrorestrictive actuator stacks, microelectromechanical-system ("MUMS") actuator stacks, and MEMS linear translators. Linear translation of mirrors avoids the introduction of tilt into propagating wavefronts and can be implemented with fewer actuators than required for tilting steering mirrors. In the case of the slider configuration, the amount of translation is noncritcal, permitting increased error tolerance without sacrificing the precision of the router. These advantages reduce the required fabrication cost, reduce coupling losses, and improve the robustness of router assemblies when compared with tilting steering mirrors. In various embodiments, the routing geometries of the invention are coupled with additional optical elements, such as focusing lenses, gradient index lenses, and/or diffraction gratings); an example of how such additional elements may be used in combination with the routing geometries is illustrated in Application Ser. No. 09/442,061, although other combinations will be apparent to those of skill in the art upon reading this disclosure.

II. Plunger Configurations: 1×2 Switch

In the plunger configuration, a high-reflectivity mirror is affixed to a linear actuator that moves the mirror in a direction perpendicular to the plane of its reflective surface. In one embodiment, the actuator is configured to limit the position of the mirror to one of two locations. Such an embodiment is illustrated in FIG. 1 where the plunger configuration is implemented as part of a 1×2 fiber switch. The 1×2 switch permits an optical signal from the input port 102 to be directed to a first output port 104 or to a second output port 106. The mirror 118 is attached to a plunger actuator 120 that is affixed to surface 116. The actuator 120 is configured to position the mirror 118 in either position "1" or position "2," in each of which the reflective plane of the mirror makes a 45° angle with the optical path 108 from the input port 102. When the mirror 118 is in location "1," the optical signal along path 108 from the input port 102 is reflected off the mirror 118, off of reflective surface 114, and along path 110 to the first output port 104. When the mirror 118 is instead in location "2," the optical signal along path 108 is reflected off mirror 118 and surface 114 along path 112 to the second output port 106. Reflective surface 114 is perpendicular to the reflective plane of the mirror 118, so that the return paths 110 and 112 to the output ports 104 and 106 are parallel to the path 108 from the input port 102.

III. Slider Configurations i. 1×2 Switch

Figure 2:
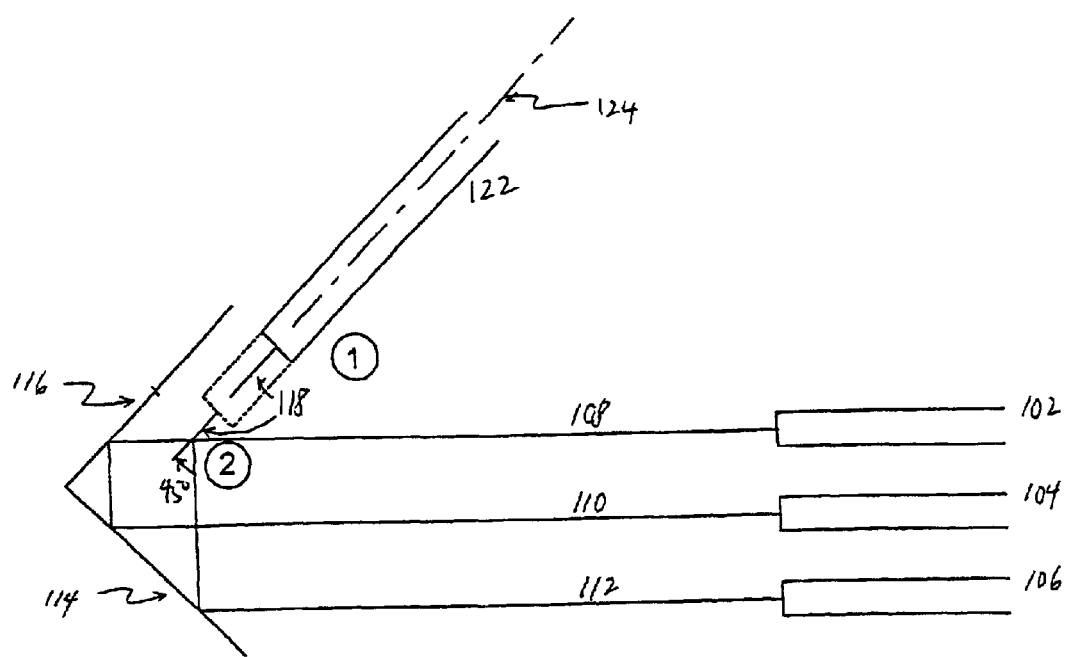
FIG. 2 illustrates the optical pathways taken in one embodiment using a slider configuration of a linearly actuated steering mirror for a 1×2 optical switch.

The slider configuration is also readily demonstrated for the 1×2 switch as shown in FIG. 2. In this embodiment, the slider actuator 122 is configured to move the mirror 118 in a direction parallel to the plane of the mirror's reflective surface, along axis 124. The actuator 122 may be in a retracted or extended position. Accordingly, when the actuator 122 is retracted to position "1," mirror 118 is not at all in the path of the optical signal from the input port 102. The signal thus propagates along path 108, is reflected off of reflective surfaces 116 and 114 and propagates along path 110 to the first output port 104. This path is changed when the mirror 118 is interposed to intersect the signal propagating along path 108. The axis 124 along which the mirror is moved is set at 45° to the optical path 108. When the actuator 122 is extended to position "2," shown with a dashed line, the signal is reflected off the mirror 118 and the surface 114 along path 112 to the second output port 106.

As for the plunger configuration for the 1×2 switch, reflective surface 114 is perpendicular to the reflective plane of the mirror 118, so that the return paths 110 and 112 to the output ports 104 and 106 are parallel to the path 108 from the input port 102. The positioning of the mirror 118 requires relatively low accuracy when compared either with the accuracy needed for tilting mirrors or with the accuracy required for a translating mirror using the plunger configuration. Provided the mirror 118 intersects path 108, the optical arrangement ensures that the signal will be directed along path 110 or 112 as required to the appropriate output port 106. Even substantial deviations in the position of the mirror along axis 124 are tolerable. As seen below, this advantage generally inheres to any embodiment using the slider configuration.

ii. Triple-Slider 2×2 Switch

Figure 3A:
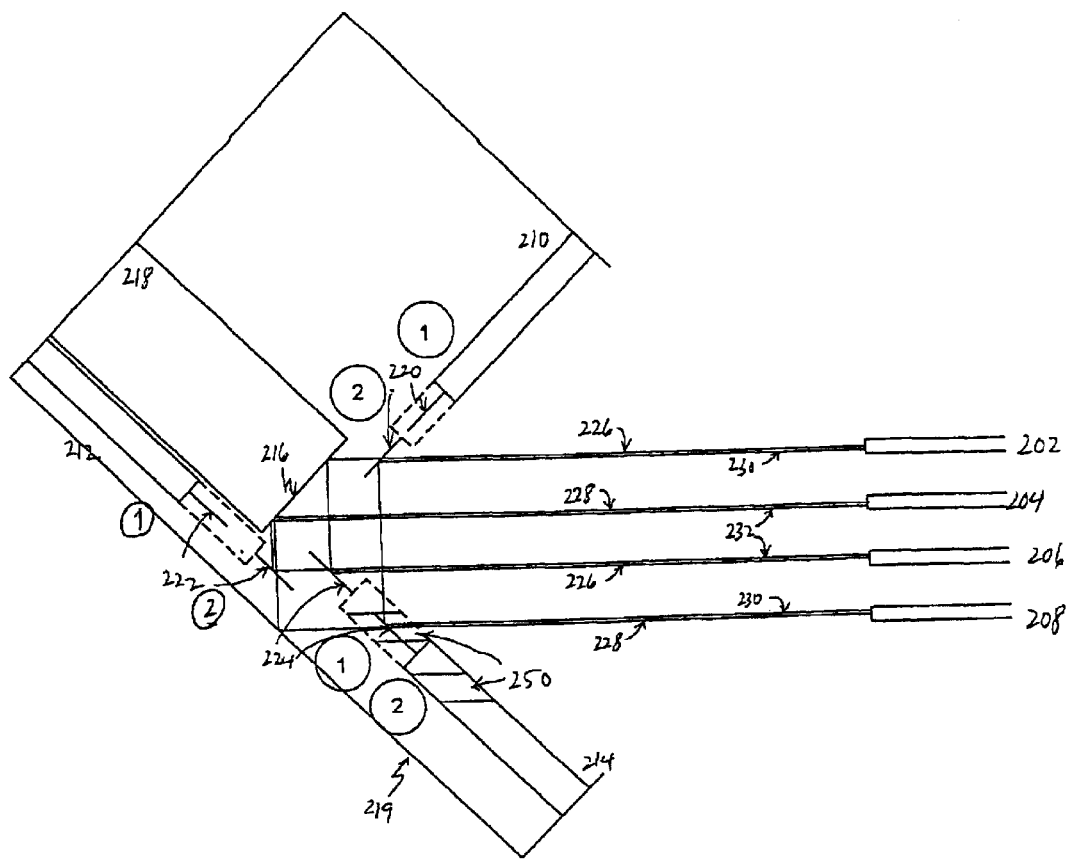
FIG. 3 illustrates the optical pathways taken in one embodiment where a 2×2 optical switch is implemented with a triple-slider configuration of linearly actuated steering mirrors; part (a) shows the relative positions of the mirrors and optical pathways by superposing the two switch positions while parts (b) and (c) show the pathways for the switch positions individually.
Figure 3B:
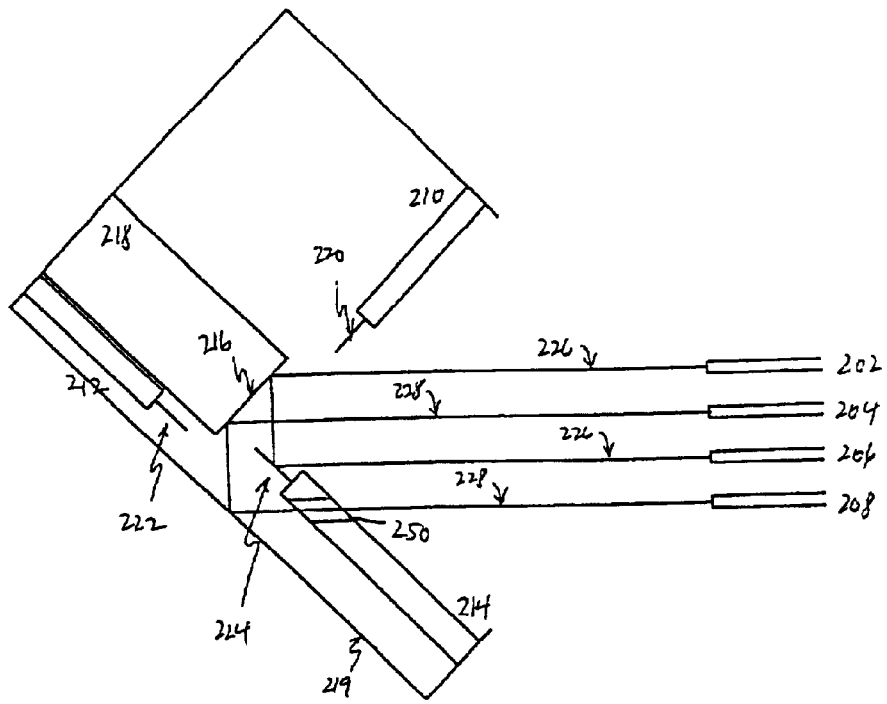
Figure 3C:
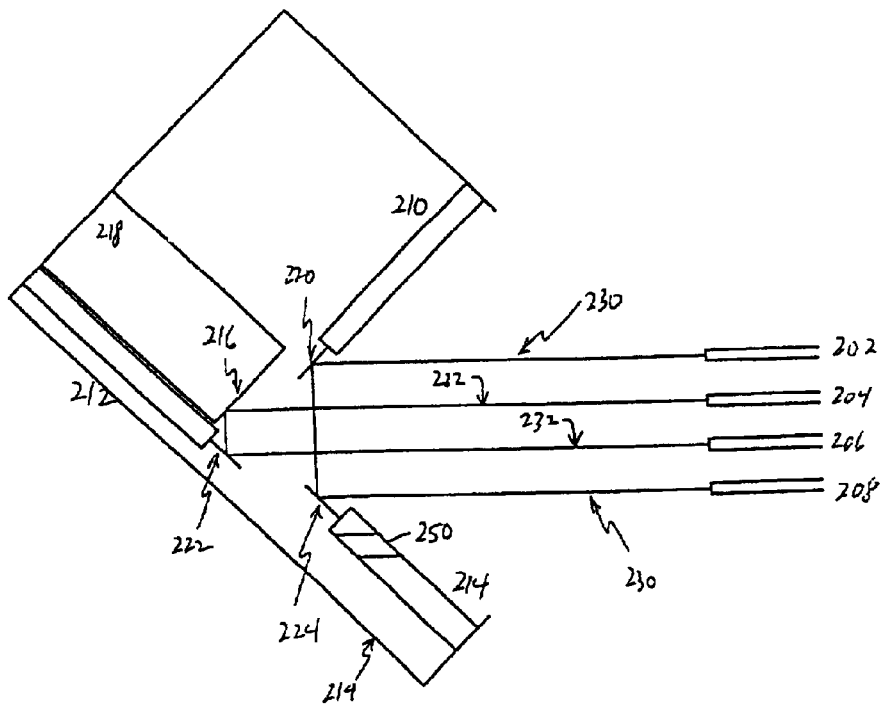

A slider configuration can also be used for the 2×2 switch. One such embodiment that uses three linearly actuated translators is shown in FIG. 3. As before, each actuator may be in either an extended or a retracted position. For ease of understanding, the figure is shown in three parts: FIG. 3(a) shows a superposition of the actuator positions, steering mirror positions, and optical pathways for the two switch positions, while FIG. 3(b) and FIG. 3(c) respectively break this down into for the two individual switch positions, "1" and "2" respectively. It is useful to refer to FIG. 3(a) to see the relative positions of the component actuators and steering mirrors between the two witch positions, while FIGS. 3(b) and FIG. 3(c) are more useful to follow the optical pathways that those positions produce.

Referring generally to FIG. 3 as a whole, the 2×2 switch comprises two input ports 202 and 204 and two output ports 206 and 208. In the passthrough configuration ("1"), an optical signal from input port 202 (204) is directed to output port 206 (208), while in the crossed configuration ("2"), an optical signal from input port 202 (204) is directed to output port 208 (206). The three slider actuators are positioned at right angles such that actuator 210 is perpendicular to actuator 212, which is itself perpendicular to actuator 214. This same relative perpendicularity thus applies to the three steering mirrors respectively affixed to the actuators, so that mirror 220 is perpendicular to mirror 222, which is itself perpendicular to mirror 224. All three mirrors 220, 222, and 224 are oriented such that the plane of their reflective surfaces makes a 45° angle with an optical path followed by a signal either from one of the input ports 202 or 204 or to one of the output ports 206 or 208. Such optical signals are thus always parallel. Reflective surfaces 216 and 219 are provided to direct some of the optical signals as explained below. In the illustrated embodiment, reflective surface 216 is a fixed mirror formed on a fixed block 218, although alternative means for providing reflective surface 216 will be apparent to those of skill in the art and are within the scope of the invention. In the illustrated embodiment, reflective surface 219 is a plane mirror, although alternatives are again within the scope of the invention.

When the switch is in the passthrough configuration ("1"; FIG. 3(b)), actuators 210 and 212 are in a retracted position and actuator 214 is in an extended position. When actuators 210 and 212 are in their retracted positions, mirrors 220 and 222 do not participate in the optical routing, The optical signal from input port 202 follows path 226, being reflected off reflective surface 216 and mirror 224 to output port 206. The optical signal from input port 204 follows path 228, being reflected off reflective surfaces 216 and 219 to propagate through actuator 214 to output port 208. In the illustrated embodiment, actuator 214 comprises a bore 250 configured such that path 228 is unobstructed when actuator 214 is in its extended position. In an alternative embodiment, the actuator 214 is formed of an antireflective material transparent at the wavelength of the optical signal. In still another alternative embodiment, the bore 250 is replaced with a transparent antireflective material while the remainder of the actuator 214 is formed of a different material.

When the switch is in the crossed configuration ("2"; FIG. 3(c)), actuators 210 and 212 are in an extended position and actuator 214 is in a retracted position. The optical signal from input port 202 follows path 230, reflecting off mirrors 220 and 224 to output port 208. The optical signal from input port 204 follows path 232, being reflected off reflective surface 216 and mirror 222 to output port 206. In this configuration, all three mirrors are used.

iii. Single-Slider 2×2 Switch

Figure 4A:
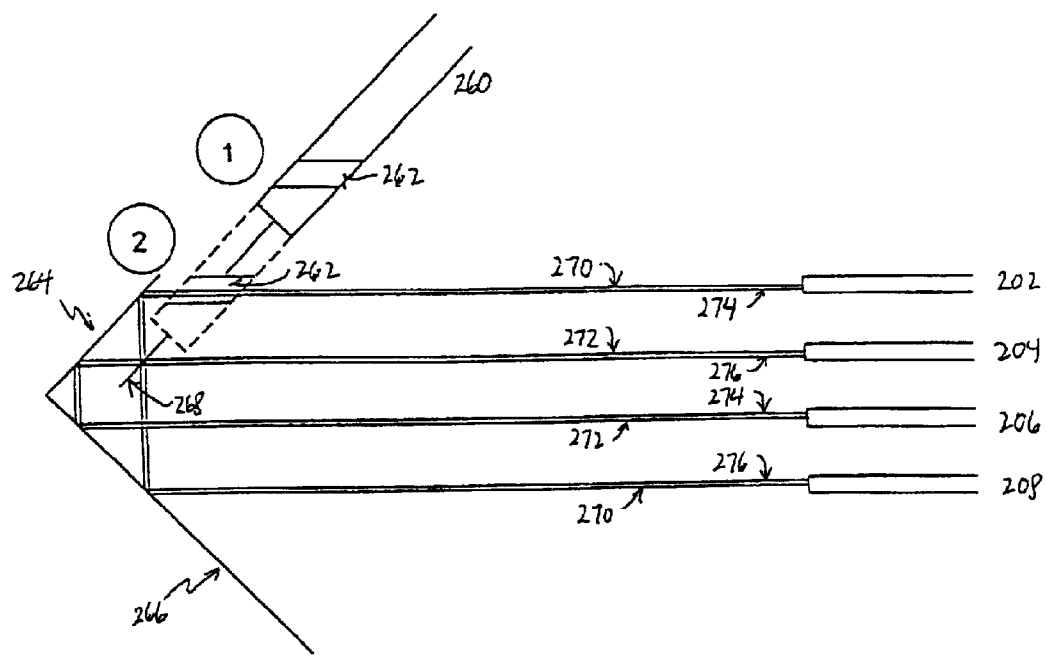
FIG. 4 illustrates the optical pathways taken in one embodiment where a 2×2 optical switch is implemented with a single linearly actuated steering mirror in a slider configuration; part (a) shows the relative positions of the mirror and optical pathways by superposing the two switch positions while parts (b) and (c) show the pathways for the switch positions individually.
Figure 4B:
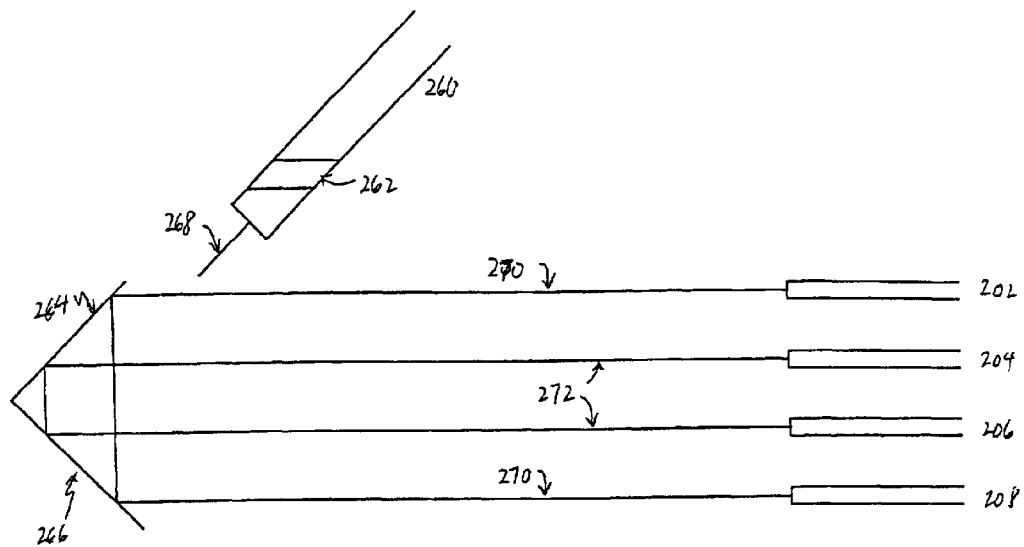
Figure 4C:
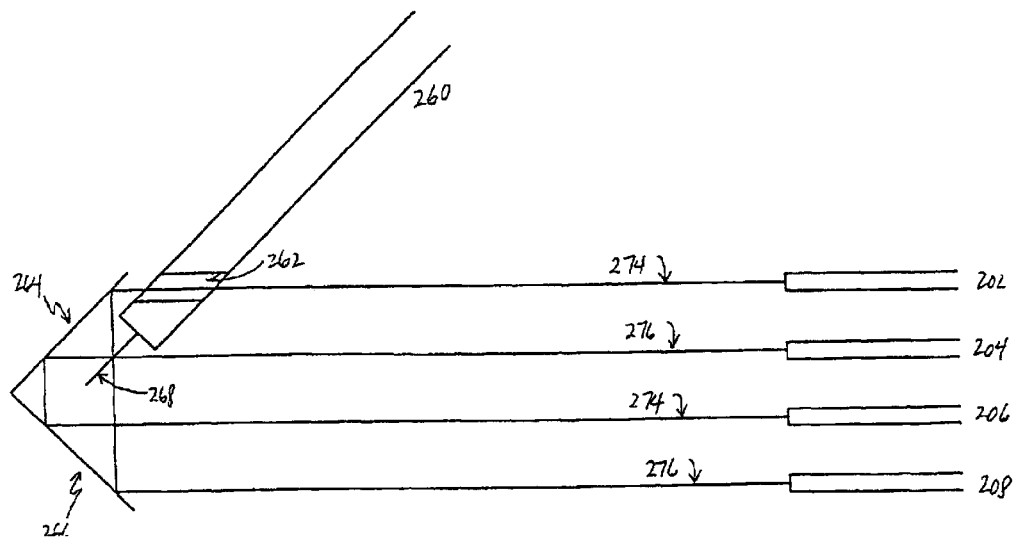

In an alternative embodiment, a single linearly actuated slider that can be in an extended or retracted position is used as part of a 2×2 switch. As shown in FIG. 4, a steering mirror 268 that is reflective on both sides is moved by the actuator 260 along a direction at 45° to the paths followed by the optical signals. FIG. 4 is presented in three parts: FIG. 4(a) shows the two switch positions ("1" and "2") simultaneously, permitting easy comparison of the optical paths used for the two positions; FIGS. 4(b) and 4(c) respectively show the configurations for the first and second positions individually to highlight the individual optical paths used. In the illustrated embodiment, the actuator 260 includes a bore 262 to permit the propagation of an optical signal through the actuator when it would otherwise block the optical path. In alternative embodiments, nonreflective materials transparent at the wavelengths of the optical signals replace either the bore 262 or the entire actuator 260, thereby also permitting propagation through the actuator 260 as necessary.

Referring generally to FIG. 4 as a whole, the switch comprises, in addition to the actuator 260, two reflective surfaces 264 and 266 that join at a 90° angle, the first surface 264 being parallel to the steering mirror 268 and the second surface 266 being perpendicular to the steering mirror 268. The passthrough configuration ("2"; FIG. 4(c)), wherein a signal is propagated from input port 202 (204) to output port 206 (208), is achieved when the actuator 260 is in its extended position. In this configuration, the optical signal from input port 202 follows path 274 through the bore 262 of the actuator 260, is reflected off the first reflective surface 264 to the steering mirror 268, where it is reflected back to the first reflective surface 264, from which it is reflected to the second reflective surface 266, from which it is reflected to output port 206. The optical signal from input port 204 follows path 276, being reflected off the steering mirror 268 and the second reflective surface 266 to output port 208.

In the crossed configuration ("1" FIG. 4(b)), wherein a signal is propagated from input port 202 (204) to output port 208 (206), the actuator 260 is in the retracted position so that the steering mirror 268 is not involved in the routing. The path followed by the two signals is very similar in such a configuration: the signal from input port 202 (204) follows path 270 (272), being reflected off reflective surface 264 and reflective surface 266 to output port 208 (206).

IV. Mixed Plunger-Slider Configurations: 2×2 Switch

Figure 5A:
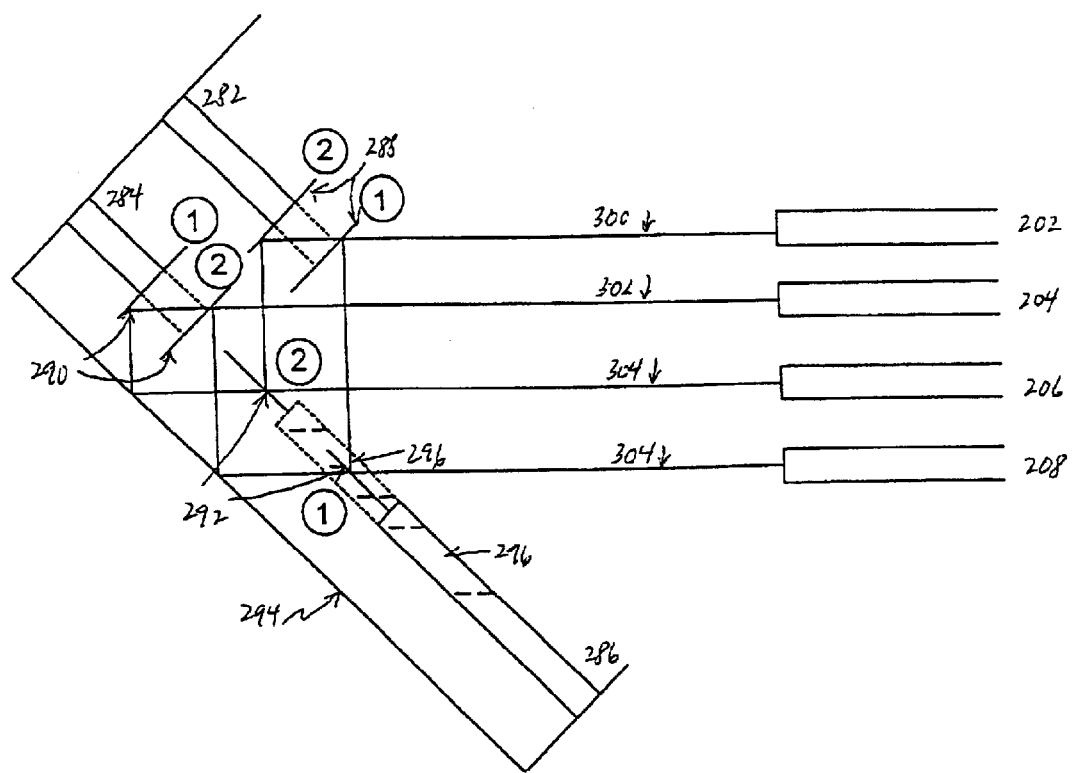
FIG. 5 illustrates the optical pathways taken in one embodiment where a 2×2 optical switch is implemented with three linearly actuated steering mirrors, two of which are in a plunger configuration and one of which is in a slider configuration; part (a) shows the relative positions of the mirrors and optical pathways by superposing the two switch positions while parts (b) and (c) show the pathways for the switch positions individually.

Embodiments of the invention also include configurations that use a combination of plunger actuators and slider actuators. One such embodiment is illustrated in FIG. 5 using two steering mirrors 288 and 290 attached respectively to linear translators 282 and 284 in the plunger configuration and one steering mirror 292 attached to a linear translator 286 in the slider configuration. Each of the linear translators 282, 284, and 292 can be in a retracted or extended position, the dotted lines in FIG. 5(a) being used to show the extended configuration of each translator. Each linear translator moves its respective mirror along a direction inclined 45° to the input and output optical paths so that each of the steering mirrors is also inclined 45° to those paths. In this embodiment, surface 294 is also used in directing the optical signals and is therefore reflective. It is oriented parallel to mirror 292 so that it too is inclined 45° to the input and output optical paths. As before, part (a) of the figure shows a superposition of the two switch positions to facilitate comparison of the relative locations of the actuators and pathways, while parts (b) and (c) show the optical pathways for each switch position individually.

Figure 5B:
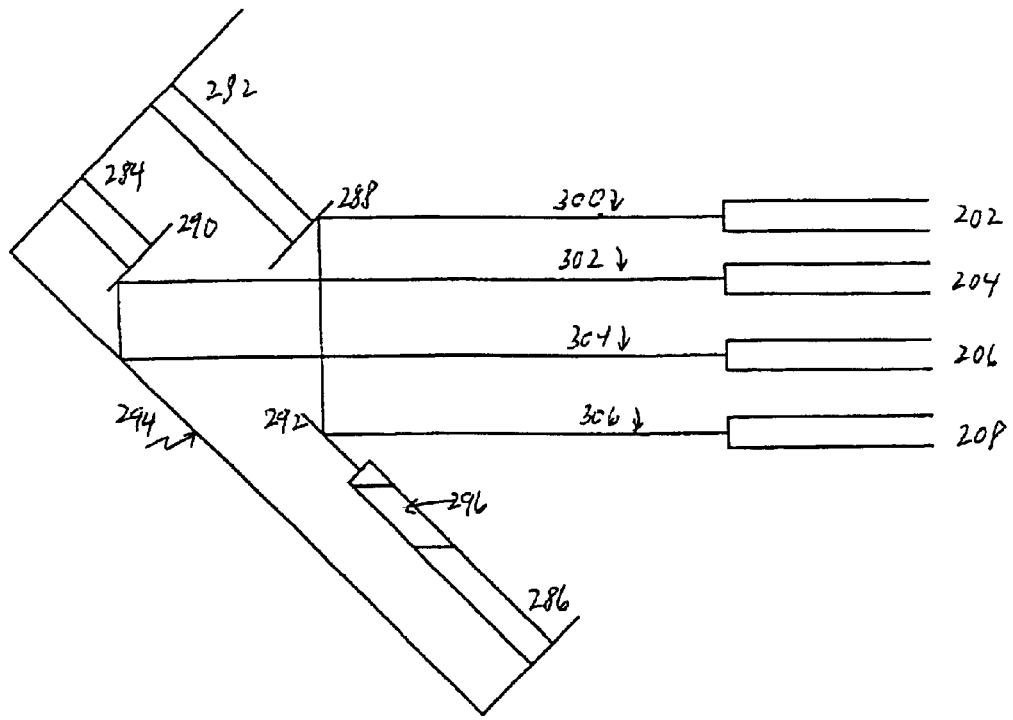
Figure 5C:
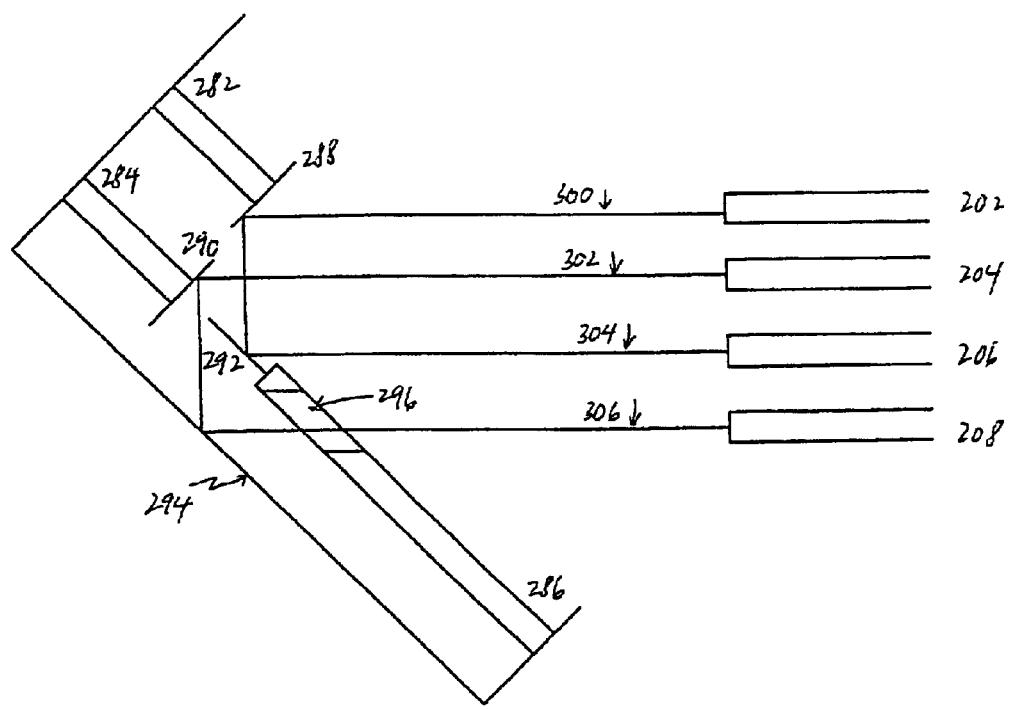

Referring generally to FIG. 5 as a whole, in the passthrough configuration ("2"; FIG. 5(c)) where an optical signal from input port 202 (204) is propagated to output port 206 (208), the first plunger actuator 282 is in a retracted position, the second plunger actuator 284 is in an extended position, and the slider actuator 286 is in an extended position. The optical signal from input port 202 thus propagates along path 300 to mirror 288 where it is reflected to mirror 292, which in turn reflects it back along path 304 to output port 206. The optical signal from port 204 propagates along path 302 to mirror 290 where it is reflected to reflective surface 294, which in turn reflects it back along path 306 through the slider actuator 286 to output port 208. In the illustrated embodiment, propagation of the optical signal through the slider actuator 286 is achieved with a bore 296 through the actuator 286; in alternative embodiments, the bore 296 or the entire actuator 286 is substituted with a nonreflective material that is transparent to the wavelength of the optical signal.

In the crossed configuration ("1"; FIG. 5(b)), where an optical signal is propagated from input port 202 (204) to output port 208 (206), the first plunger actuator 282 is in an extended position, the second plunger actuator 284 is in a retracted position, and the slider actuator 286 is in a retracted position. In this configuration, the optical signals are routed by the same elements as in the passthrough configuration. The optical signal from input port 202 propagates along path 300, reflects off mirror 288 to mirror 292, where it is reflected along path 306 to output port 208. The optical signal from port 204 propagates along path 302 to mirror 290 where it is reflected to reflective surface 294, which in turn reflects it along path 304 to output port 206. While the signal from input port 202 is always routed by mirrors 288 and 292 and the signal from input port 204 always routed by mirror 290 and reflective surface 294, the final path is different because of the different positions of the mirrors. In this embodiment, all three steering mirrors are used when the 2×2 switch is in either the passthrough or crossed configuration.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An optical routing apparatus for directing an optical signal, the optical routing apparatus comprising:

(a) an input port configured to provide the optical signal;

(b) a plurality of output ports configured to receive the optical signal;

(c) a mirror; and (d) a linear actuator disposed to move the mirror along an axis to a plurality of mirror positions, wherein in a first of such mirror positions the mirror is disposed such that the optical signal follows a first optical path from the input port to a first of the plurality of output ports, the first optical path including a reflection off the mirror, and wherein the mirror is disposed perpendicular to the axis.

2. The optical routing apparatus according to claim 1 wherein the plurality of output ports consists of two output ports.

3. The optical routing apparatus according to claim 1 further comprising a fixed reflective surface disposed such that the first optical path further includes a reflection off the fixed reflective surface.

4. The optical routing apparatus according to claim 3 wherein the fixed reflective surface is oriented perpendicular to the mirror.

5. The optical routing apparatus according to claim 4 wherein in a second of such mirror positions the mirror is disposed such that the optical signal follows a second optical path from the input port to a second of the plurality of output ports, the second optical path including a reflection off the mirror and off the fixed reflective surface.

6. An optical routing apparatus for directing an optical signal, the optical routing apparatus comprising:
   (a) an input port configured to provide the optical signal;
   (b) a plurality of output ports configured to receive the optical signal;
   (c) a mirror;
   (d) a first fixed reflective surface; and
   (e) a linear actuator disposed to move the mirror alone an axis to a plurality of mirror positions, wherein the mirror is disposed parallel to the axis and wherein in a first of such mirror positions the mirror is disposed such that the optical signal follows a first optical path from the input port to a first of the plurality of output ports, the first optical path including a reflection off the mirror and including a reflection off the first fixed reflective surface.

7. The optical routing apparatus according to claim 6 wherein the first fixed reflective surface is oriented perpendicular to the mirror.

8. The optical routing apparatus according to claim 6 further comprising a second fixed reflective surface,
   wherein in a second of such mirror positions the mirror is disposed such that the optical signal follows a second optical path from the input port to a second of the plurality of output ports, the second optical path including a reflection off the second fixed reflective surface and off the first fixed reflective surface.

9. The optical apparatus according to claim 1 wherein the mirror is disposed at an angle between 40° and 50° to the axis.

10. An optical routing apparatus for directing a first optical signal and a second optical signal, the optical routing apparatus comprising:
    (a) a first input port configured to provide the first optical signal;
    (b) a second input port configured to provide the second optical signal;
    (c) a first output port configured to receive one of the first and second optical signals;
    (d) a second output port configured to receive one of the first and second optical signals;
    (e) a primary mirror; and
    (f) a primary linear actuator disposed to move the primary mirror along a primary axis to a plurality of primary mirror positions, the primary mirror being disposed parallel to the primary axis,
       wherein in a first of such primary mirror positions the primary mirror is disposed such that the first optical signal follows a first optical path to the first output port and the second optical signal follows a second optical path to the second output port,
       wherein in a second of such primary mirror positions the primary mirror is disposed such that the first optical signal follows a third optical path to the second output port and the second optical signal follows a fourth optical path to the first output port,
       wherein the primary linear actuator lies in the path of the first optical signal in at least one of such first and second primary mirror positions.

11. The optical routing apparatus according to claim 10 wherein the primary linear actuator comprises a bore through which the first optical signal propagates when the primary mirror is positioned so that the primary linear actuator lies in the path of the first optical signal.

12. The optical routing apparatus according to claim 10 wherein the primary linear actuator comprises an antireflective region transparent to a wavelength of the first optical signal, the region disposed such that the first optical signal propagates through the region when the primary mirror is positioned so that the primary linear actuator lies in the path of the first optical signal.

13. The optical routing apparatus according to claim 10 wherein the primary linear actuator is antireflective and transparent to a wavelength of the first optical signal.

14. An optical routing apparatus for directing a first optical signal and a second optical signal, the optical routine apparatus comprising:
    (a) a first input port configured to provide the first optical signal;
    (b) a second input port configured to provide the second optical signal;
    (c) a first output port configured to receive one of the first and second optical signals;
    (d) a second output port configured to receive one of the first and second optical signals;
    (e) a primary mirror that is reflective on two sides;
    (e) a first fixed reflective surface;
    (f) a second fixed reflective surface; and
    (g) a primary linear actuator disposed to move the primary mirror along a primary axis to a plurality of primary mirror positions, the primary mirror being disposed parallel to the primary axis,
       wherein in a first of such primary mirror positions the primary mirror is disposed such that the first optical signal follows a first optical path to the first output port and the second optical signal follows a second optical path to the second output port,
       wherein in a second of such primary mirror positions the primary mirror is disposed such that the first optical signal follows a third optical path to the second output port and the second optical signal follows a fourth optical path to the first output port, such first and second fixed reflective surfaces being disposed such that
       the first optical path includes a reflection off a first reflective side of the primary mirror, two reflections off the first fixed reflective surface, and a reflection off the second fixed reflective surface,
       the second optical path includes a reflection off a second reflective side of the primary mirror and a reflection off the second fixed reflective surface,
       the third optical path includes a reflection off the first fixed reflective surface and a reflection off the second fixed reflective surface, and
       the fourth optical path includes a reflection off the first fixed reflective surface and a reflection off the second fixed reflective surface.

15. An optical routing apparatus for directing a first optical signal and a second optical signal, the optical routing apparatus comprising:

(a) a first input port configured to provide the first optical signal;

(b) a second input port configured to provide the second optical signal;

(c) a first output port configured to receive one of the first and second optical signals;

(d) a second output port configured to receive one of the first and second optical signals;

(e) a primary mirror; and (f) a primary linear actuator disposed to move the primary mirror along a primary axis to a plurality of primary mirror positions, the primary mirror being disposed parallel to the primary axis, wherein in a first of such primary mirror positions the primary mirror is disposed such that the first optical signal follows a first optical path to the first output port and the second optical signal follows a second optical path to the second output port, wherein in a second of such primary mirror positions the primary mirror is disposed such that the first optical signal follows a third optical path to the second output port and the second optical signal follows a fourth optical path to the first output port;

(g) a secondary mirror;

(h) a secondary linear actuator disposed to move the secondary mirror along a secondary axis to a plurality of secondary mirror positions;

(i) a tertiary mirror; and (j) a tertiary linear actuator disposed to move the tertiary mirror along a tertiary axis to a plurality of tertiary mirror positions, wherein in the first primary mirror position, the secondary mirror is disposed at a predetermined first secondary mirror position and the tertiary mirror is disposed at a predetermined first tertiary mirror position, and wherein in the second primary mirror position, the secondary mirror is disposed at a predetermined second secondary mirror position and the tertiary mirror is disposed at a predetermined second tertiary mirror position.

16. The optical routing apparatus according to claim 15 wherein the secondary mirror is disposed parallel to the secondary axis and the tertiary mirror is disposed parallel to the tertiary axis.

17. The optical routing apparatus according to claim 16 wherein at least one of the primary, secondary, and tertiary linear actuators comprises a bore through which at least one of the first, second, third, and fourth optical signals propagates.

18. The optical routing apparatus according to claim 16 wherein at least one of the primary, secondary, and tertiary linear actuators comprises an antireflective region transparent to a wavelength of at least one of the first, second, third, and fourth optical signals and through which such at least one optical signal propagates.

19. The optical routing apparatus according to claim 16 wherein at least one of the primary, secondary, and tertiary linear actuators is antireflective and transparent to a wavelength of at least one of the first, second, third, and fourth optical signals.

20. The optical routing apparatus according to claim 16 further comprising a first fixed reflective surface and a second fixed reflective surface, such first and second fixed reflective surfaces being disposed such that the first optical path includes a reflection off the first fixed reflective surface and a reflection off the tertiary mirror, the second optical path includes a reflection off the first fixed reflective surface and a reflection off the second fixed reflective surface, the third optical path includes a reflection off the primary mirror and a reflection off the tertiary mirror, and the fourth optical path includes a reflection off the first fixed reflective surface and a reflection off the secondary mirror.

21. The optical routing apparatus according to claim 15 wherein the secondary mirror is disposed perpendicular to the secondary axis.

22. The optical routing apparatus according to claim 21 wherein the primary linear actuator comprises a bore through which at least one of the first, second, third, and fourth optical signals propagates.

23. The optical routing apparatus according to claim 21 wherein the primary linear actuator comprises an antireflective region transparent to a wavelength of at least one of the first, second, third, and fourth optical signals and through which such at least one optical signal propagates.

24. The optical routing apparatus according to claim 21 wherein the primary linear actuator is antireflective and transparent to a wavelength of at least one of the first, second, third, and fourth optical signals.

25. The optical routing apparatus according to claim 21 wherein the tertiary mirror is disposed perpendicular to the tertiary axis.

26. The optical routing apparatus according to claim 25 further comprising a fixed reflective surface disposed such that the first optical path includes a reflection off the tertiary mirror and a reflection off the primary mirror, the second optical path includes a reflection off the secondary mirror and a reflection off the fixed reflective surface, the third optical path includes a reflection off the tertiary mirror and a reflection off the primary mirror, and the fourth optical path includes a reflection off the secondary mirror and a reflection off the fixed reflective surface.

27. The optical apparatus according to claim 10 wherein the primary mirror is disposed at an angle between 40° and 50° to the primary axis.

28. A method for directing an optical signal, the method comprising:

(a) providing the optical signal from an input port; and (b) reflecting the optical signal off a mirror that is configured for linear actuation along an axis to a plurality of mirror positions, wherein in a first of such mirror positions the mirror is disposed such that the optical signal follows a first optical path from the input port to a first of a plurality of output ports, and wherein the mirror is disposed perpendicular to the axis.

29. The method according to claim 28 wherein the plurality of output ports consists of two output ports.

30. The method according to claim 28 further comprising reflecting the optical signal along the first optical path off a fixed reflective surface.

31. The method according to claim 30 wherein the fixed reflective surface is oriented perpendicular to the mirror.

32. The method according to claim 30 wherein in a second of such mirror positions the mirror is disposed such that the optical signal follows a second optical path from the input port to a second of the plurality of output ports, the second optical path including a reflection off the mirror and off the fixed reflective surface.

33. A method for directing an optical signal, the method comprising:
(a) providing the optical signal from an input port;
(b) reflecting the optical signal off a mirror that is configured for linear actuation along an axis to a plurality of mirror positions, wherein in a first of such mirror positions the mirror is disposed such that the optical signal follows a first optical path from the input port to a first of a plurality of output ports, and wherein the mirror is disposed parallel to the axis; and
(c) reflecting the optical signal along the first optical path off a first fixed reflective surface.

34. The method according to claim 33 wherein the first fixed reflective surface is oriented perpendicular to the mirror.

35. The method according to claim 33 wherein in a second of such mirror positions the mirror is disposed such that the optical signal follows a second optical path from the input port to a second of the plurality of output ports, the second optical path including a reflection off the second fixed reflective surface and off the first fixed reflective surface.

36. The method according to claim 28 wherein the mirror is disposed at an angle between 40° and 50° to the axis.

37. A method for directing a first optical signal and a second optical signal, the method comprising:
(a) providing the first optical signal from a first input port;
(b) providing the second optical signal from a second input port; and
(c) reflecting the first optical signal off a primary mirror that is configured for linear actuation along a primary axis to a plurality of primary mirror positions,
wherein the primary mirror is reflective on two sides and is disposed parallel to the primary axis.
wherein in a first of such primary mirror positions the primary mirror is disposed such that the first optical signal follows a first optical path to a first of a plurality of output ports and the second optical signal follows a second optical path to a second of the plurality of output ports, and
wherein in a second of such primary mirror positions the primary mirror is disposed such that the first optical signal follows a third optical path to the second output port and the second optical signal follows a fourth optical path to the first output port
wherein the first optical path includes a reflection off a first reflective side of the primary mirror two reflections off a first fixed reflective surface, and a reflection off a second fixed reflective surface,
wherein the second optical path includes a reflection off a second reflective side of the primary mirror and a reflection off the second fixed reflective surface,
wherein the third optical path includes a reflection off the first fixed reflective surface and a reflection off the second fixed reflective surface, and
wherein the fourth optical path includes a reflection off the first fixed reflective surface and a reflection off the second fixed reflective surface.

38. A method for directing a first optical signal and a second optical signal, the method comprising:
(a) providing the first optical signal from a first input port;
(b) providing the second optical signal from a second input port; and
(c) a reflecting the first optical signal off a primary mirror that is configured for linear actuation along a primary axis to a plurality of primary mirror positions,
wherein the primary mirror is disposed parallel to the primary axis,
wherein in a first of such primary mirror positions the primary mirror is disposed such that the first optical signal follows a first optical path to a first of a plurality of output ports and the second optical signal follows a second optical path to a second of the plurality of output ports, and
wherein in a second of such primary mirror positions the primary mirror is disposed such that the first optical signal follows a third optical path to the second output port and the second optical signal follows a fourth optical path to the first output port,
(d) reflecting at least one of the first optical signal and the second optical signal off a secondary mirror that is configured for linear actuation along a secondary axis to a plurality of secondary mirror positions; and
(e) reflecting at least one of the first optical signal end and the second optical signal off a tertiary mirror that is configured for linear actuation along a tertiary axis to a plurality of tertiary mirror positions,
wherein in the first primary mirror position, the secondary mirror is disposed at a predetermined first secondary mirror position and the tertiary mirror is disposed at a predetermined first tertiary mirror position, and
wherein in the second primary mirror position, the secondary mirror is disposed at a predetermined second secondary mirror position and the tertiary mirror is disposed at a predetermined second tertiary mirror position.

39. The method according to claim 38 wherein the secondary mirror is disposed parallel to the secondary axis and the tertiary mirror is disposed parallel to the tertiary axis.

40. The method according to claim 39,
wherein the first optical path includes a reflection off a first fixed reflective surface and a reflection off the tertiary mirror,
wherein the second optical path includes a reflection off the first fixed reflective surface and a reflection off a second fixed reflective surface,
wherein the third optical path includes a reflection off the primary mirror and a reflection off the tertiary mirror, and
wherein the fourth optical path includes a reflection off the first fixed reflective surface and a reflection off the secondary mirror.

41. The method according to claim 38 wherein the secondary mirror is disposed perpendicular to the secondary axis.

42. The method according to claim 41 wherein the tertiary mirror is disposed perpendicular to the tertiary axis.

43. The method according to claim 42,
wherein the first optical path includes a reflection off the tertiary mirror and a reflection off the primary mirror,
wherein the second optical path includes a reflection off the secondary mirror and a reflection off a fixed reflective surface,
wherein the third optical path includes a reflection off the tertiary mirror and reflection off the primary mirror, and
wherein the fourth optical path includes a reflection off the secondary mirror and a reflection off the fixed reflective surface.

44. The method according to claim 37 wherein the primary mirror is disposed at an angle between 40° and 50° to the primary axis.

45. A wavelength router for receiving, at an input port, light having a plurality of spectral bands and directing subsets of the spectral bands to respective ones of a plurality of output ports, the wavelength router comprising:

(a) a free-space optical train disposed between the input port and the output ports providing optical paths for routing the spectral bands, the optical train including a dispersive element disposed to intercept light traveling from the input port; and (b) an array of optical routing mechanisms configured to direct each given spectral band, each such optical routing mechanism including:

(i) a mirror; and (ii) a linear actuator disposed to move the mirror along an axis to a plurality of mirror positions, wherein each given spectral band is directed to different output ports depending on the position of the linear actuator.

46. The wavelength router according to claim 45 wherein the dispersive clement is a grating.

47. The wavelength router according to claim 46 wherein the optical train includes focusing power incorporated into the grating.

48. The wavelength router according to claim 46 wherein the grating is a reflective grating.

49. The wavelength router according to claim 46 wherein the grating is a transmissive grating.

50. The wavelength router according to claim 45 wherein the mirror is disposed perpendicular to the axis.

51. The wavelength router according to claim 45 wherein the mirror is disposed parallel to the axis.

52. The wavelength router according to claim 45 wherein each optical routing mechanism is configured such that in a first position of the linear actuator, a first of the plurality of spectral bands is directed to a first of the plurality of output ports and a second of the plurality of spectral bands is directed to a second of the plurality of output ports, and in a second position of the linear actuator, the first spectral band is directed to the second output port and the second spectral band is directed to the first output port.

53. The wavelength router according to claim 52 wherein the mirror is reflective on two sides.

54. The wavelength router according to claim 52 wherein each optical routing mechanism further includes:

(iii) a second mirror;

(iv) a third mirror;

(v) a second linear actuator disposed to move the second mirror along a second axis to a plurality of second mirror positions; and (vi) a third linear actuator disposed to move the third mirror along a third axis to a plurality of third mirror positions.

55. The wavelength router according to claim 54 wherein at least one of the first, second, and third linear actuators comprises a bore through which one of the spectral bands is directed.

56. The wavelength router according to claim 54 wherein at least one of the first, second, and third linear actuators comprises an antireflective region transparent to a wavelength of one of the spectral bands and through which such one of the spectral bands is directed.

* * * * *